United States Patent [19]
Gallo et al.

[11] 3,841,686
[45] Oct. 15, 1974

[54] PET WASTE PICKUP DEVICE

[76] Inventors: Joseph Gallo; Lillian Fletcher, both of 73 Troutman St., Brooklyn, N.Y. 11206

[22] Filed: Mar. 23, 1973

[21] Appl. No.: 344,121

[52] U.S. Cl.............. 294/19 R, 294/1 R, 294/115
[51] Int. Cl. ........................................... A47f 13/06
[58] Field of Search........ 294/1 R, 19 R, 50.5, 50.6, 294/50.7, 50.8, 55, 100, 115, 116; 119/1 R

[56] References Cited
UNITED STATES PATENTS

| | | | |
|---|---|---|---|
| 294,147 | 2/1884 | Poole | 294/115 |
| 877,389 | 1/1908 | Werd | 294/115 |
| 2,185,346 | 1/1940 | Kulp | 294/115 X |
| 2,191,170 | 2/1940 | Keehn et al. | 294/110 A |
| 2,509,630 | 5/1950 | Duffy | 294/115 X |
| 2,553,479 | 5/1951 | Schmarje et al. | 294/100 X |
| 2,654,626 | 10/1953 | Rice | 294/50.8 |
| 3,093,402 | 6/1963 | Sisson | 294/19 R |
| 3,139,299 | 6/1964 | Bowen | 294/55 |
| 3,733,098 | 5/1973 | Tobias | 294/19 R |

*Primary Examiner*—Richard A. Schacher
*Assistant Examiner*—Johnny D. Cherry
*Attorney, Agent, or Firm*—Friedman & Goodman

[57] ABSTRACT

A pet pickup device has a tubular body provided with a handle at one end and two cylindrical sections hinged to each other at the other end. The two sections are movable between closed positions wherein they together define an enclosure for waste material and open positions wherein each section can be utilized as a scoping means for picking up the waste material. A rod, extending through the tubular body is connected at one end to a button which extends beyond the handle, the other end of the rod being connected to a plunger which is coupled to a hinge pin on which the two cylindrical sections are hinged. Support knuckles are provided on each cylindrical section, remote from the points at which they are hinged, which are supported on pivot pins transversely movable in slots provided in the shoulders of a yoke mounted on the other end of the tubular body. A helical coil cooperates with a shoulder on the button and a support block fixed inside the tubular body to urge the control rod to move in the direction of the handle — this causing the cylindrical sections to move to their closed positions and the pivot pins to move outwardly in their slots. Depression of the button into the handle causes the hinged portions of the sections to move axially relative to the pivot pins, this causing the sections to move to their opened positions. A spring biassed locking latch is provided on the handle which fixes the position of the button when the latter is depressed a predetermined amount sufficient to open the cylindrical sections to their desired positions.

15 Claims, 4 Drawing Figures

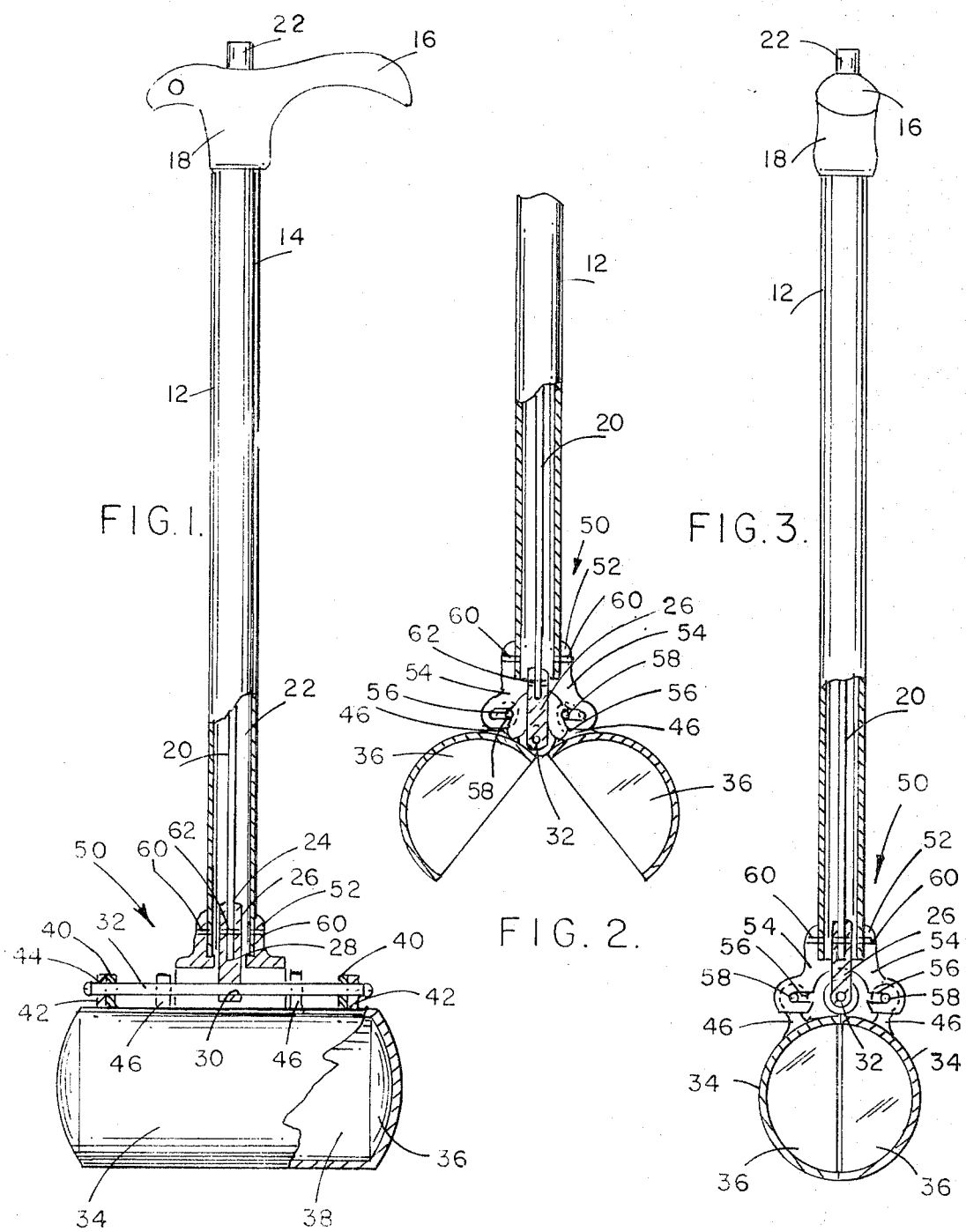

PET WASTE PICKUP DEVICE

BACKGROUND OF THE INVENTION

The present invention generally relates to pickup devices, and more particularly to a pet waste pickup device which is both practical as well as aesthetic.

Laws or ordinances which require the owners of an animal to clean up after it are becoming more common. Frequently, an owner of a dog or cat may be required to sign a lease which contains provisions that the owner remove the waste materials of his pet where the owner lives in an apartment house or a planned community.

One of the reasons why other communities have not passed legal ordinances requiring the owners of pets to so clean up is because of the unavailability at the present time of a pickup device which is both practical, functional and aesthetic.

The present invention contemplates a convenient pet waste pickup device which can accomplish the required function without the owner bending down or in any way coming into contact with the waste material. A feature of the present invention is that the enclosure, which is movable between open or scooping positions, and closed or containing positions, form an enclosed cavity which is adapted to contain the waste material after it is picked up. Consequently, the owner is not embarrassed by carrying the unsightly waste material, as was the case with many prior art pick up devices.

SUMMARY OF THE INVENTION

Accordingly, it is an object of the present invention to provide a pet waste pickup device which does not possess the above described disadvantages associated with prior art pickup devices.

It is another object of the present invention to provide a pet pickup device which is simple in construction and economical to manufacture.

It is still another object of the present invention to provide a pet waste pickup device as above described which includes two cooperating sections which are movable between open positions wherein each section acts as a scooping element and closed positions wherein the sections together define a completely closed enclosure adapted to contain the waste material.

It is yet another object of the present invention to provide a pet waste pickup device of the type under discussion which includes biassing means adapted to maintain the cooperating sections, which together define the waste containing enclosure, in a closed position.

It is a further object of the present invention to provide a pet waste pickup device which includes an elongate tubular body having a handle fixed at one end, a button slidably mounted in the handle cooperating with a control rod which is coupled to the actuating mechanism for opening and closing the sections, whereby the opening and closing of the sections can be remotely operated by depression or release of the button.

It is still a further object of the present invention to provide a pickup device as suggested above which includes an actuating mechanism for remotely opening and closing the sections defining a cavity or enclosure for containing the waste material, the actuating mechanism being almost fully hidden from view so as to enhance the aesthetic qualities of the pickup device.

It is yet a further object of the present invention to provide a pet waste pickup device which includes a handle and remotely supported hinged cylindrical sections which are movable between open and closed positions by depressing or releasing a button in the handle coupled with the sections, and which further provides a spring biassed locking latch which is adapted to engage a detent surface of the button when the latter has been sufficiently depressed to open the sections to desired positions.

In order to achieve the above objects, as well as others which will become apparent hereafter, a pet waste pickup device in accordance with the present invention comprises an elongate tubular body. A handle is provided at one end of said tubular body. An elongate control means extends through said tubular body and beyond the handle. A yoke has a neck connected to the other end of said tubular body. Said yoke has two spaced opposing shoulders each provided with an elongate slot directed in a direction transverse to the elongate direction of said tubular body, said slots being parallel to each other. Two sections are hingedly connected to each other about a hinge pin for movement between closed positions, wherein said sections together define an enclosure adapted to contain the waste, and an open positions wherein each section defines a scoop adapted for picking up the waste. Pivot pins are disposed in said respective slots and said shoulders, said pins being limited in linear movement to transverse movement within said slots. Said sections are pivotally mounted on said yoke at points remote from the hinged connections by means of said respective pivot pins. Said elongate control means has one end thereof coupled to said hinge pin for pivotting each of said sections about their respective pivot pins in response to axial displacement of the other end of said elongate control means and said hinge pin. During such axial displacement, said pivot pins only move transversely to the axial direction of movement of said elongate control means. In this manner, said sections can be remotely and selectively opened and closed while holding said handle by axially moving said elongate control means.

According to a presently preferred embodiment, said pickup device further comprises biassing means cooperating with said elongate control means and said elongate tubular body for axially biassing said elongate control means to a normal position wherein said elongate tubular body is disposed at a limiting axial position towards said handle and wherein said sections are in said closed positions.

According to another feature of the present invention, the pet pickup device is further provided with locking means for locking said sections in said open positions by maintaining said elongate control means in a position axially shifted from a normal position with respect to said handle. Said locking means comprises a spring biassed latch mounted on said handle which is snappingly engageable with a detent surface on said elongate control means when the latter is moved axially a predetermined amount which causes said sections to open to said open positions.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 1 is a front elevational view, partly in cross section, of the pet waste pickup device in accordance with the present invention;

FIG. 2 is a side elevational view of the pickup device of FIG. 1, partly in cross section, showing the sections which form the waste containing enclosure in open or scooping positions;

FIG. 3 is a view similar to FIG. 2, but wherein the sections are in closed positions together defining the enclosure for containing the waste material.

DETAILED DESCRIPTION OF THE PREFERRED EMBODIMENTS

Figure 4:
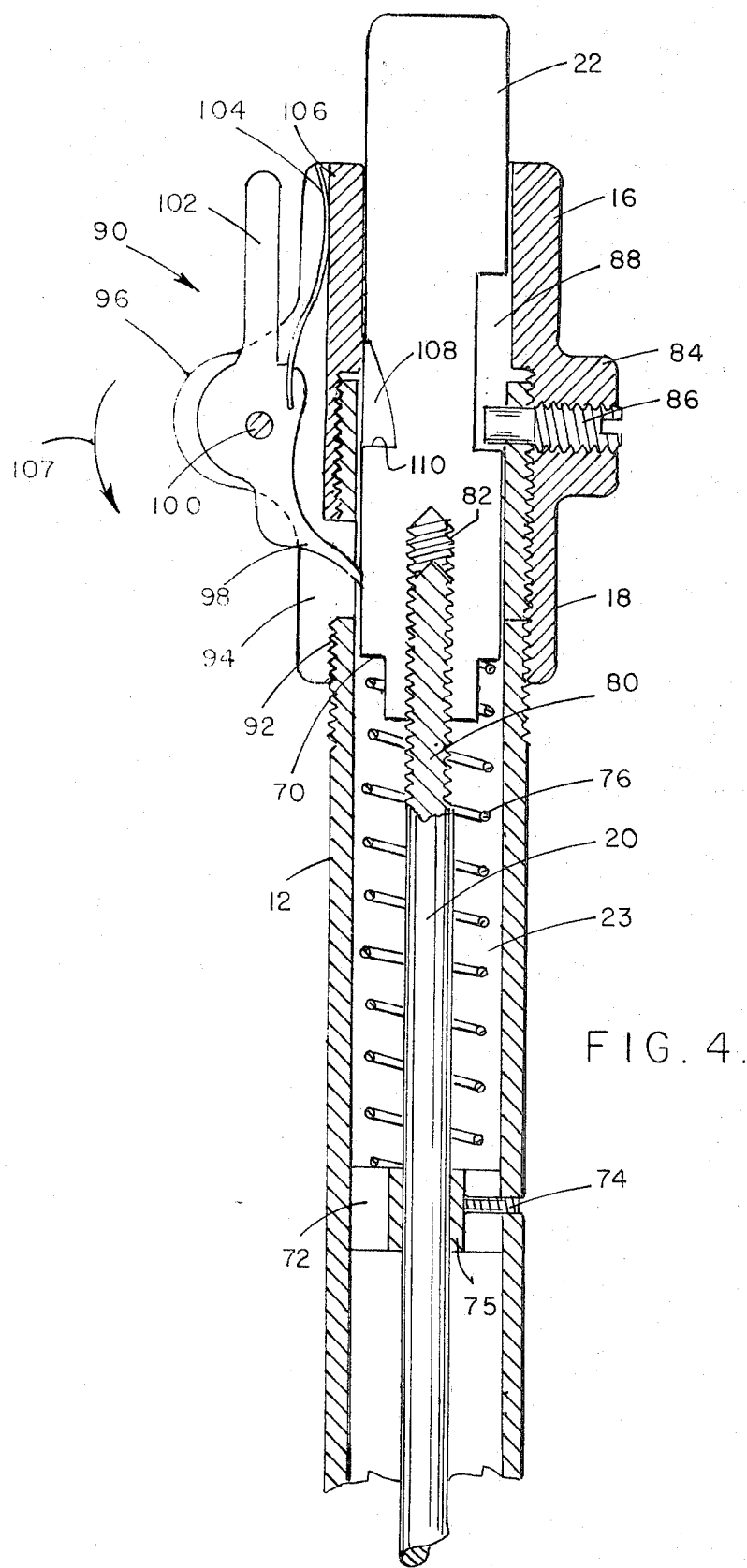
FIG. 4 is an enlarged cross section of the top portion of the device shown in FIG. 3, incorporating a locking device for maintaining the sections in open positions.

Referring now to the FIGURES, wherein similar or identical parts are designated by the same reference numerals throughout, and first referring to FIG. 1, the pet waste pickup device 10 comprises an elongate body or tubular body 12.

The tubular body 12 has provided at one end 14 thereof a handle 16, which handle 16 is provided with a socket 18 adapted to be secured or fixed to the end 14. Any conventional means for securing the handle 16 to the tubular body 12 may be utilized. One means of fixing the handle is suggested in FIG. 4 wherein the handle 16 is threadingly engaged with the tubular body.

Extending through the tubular body 12 is a control rod 20 which substantially extends the entire length of the tubular body. As can best be seen in FIG. 4, the control rod 20 extends into the region of the handle 16. A button 22 is connected, in any conventional manner, to the control rod 20. The button 22 is, for example, cylindrical and suitably dimensioned for depression by the finger of a human hand. As will become apparent hereafter, the button 22 is utilized to control the operation of the pet waste pickup device and may be easily manipulated by the user's thumb while holding the handle 16 in a conventional manner. The extent to which the button 22 projects or extends beyond the handle 16 and the degree to which it can be depressed into the handle are important considerations, as will become apparent hereafter.

At the rod end 24, remote from the end of the rod fixed to the button 22, the rod is fixed to a plunger 26 in any conventional manner. The rod end may be press fitted within an axial bore 28 provided in the plunger 26 or may be threadedly engaged with the latter. The axial bore 28 is selected to have a sufficient length so that the extent of axial engagement between the rod end 24 and the plunger 26 may be variably and selectively adjusted.

It should be clear from the above description that the effective axial length of the elongate control means, which includes the control rod 20, the button 22 and the plunger 26, may be varied somewhat by changing the degrees of axial engagement between, on the one hand, the control rod 20 and the button 22 and, on the other hand, between the control rod 20 and the plunger 26.

The plunger 26 is provided at an end remote from the end in which the axial bore 28 is provided with a transverse bore 30 which is directed in a direction normal to the axial direction of the control rod 20 and the plunger 26. Bores 44 are provided in each of the hinge knuckles 40, 42 which are dimensioned to receive with clearance the hinge pin 32. A hinge pin 32, which may be in the form of a rivet, extends through the transverse bore 30, the hinge pin 32 hingedly connecting two cylindrical half sections 34, as can best be seen in FIGS. 2 and 3.

The hinged connection between the sections 34 is effected by providing on each section an inner hinge protuberance or knuckle 40 at one end of the section and an aligned opposing outer hinge knuckle 42 at an opposite axial end of the section. Each of the hinge knuckles 40, 42 are provided with holes adapted to receive the hinge pin 32. In this manner, when the sections 34 are mated to form an enclosure, the inner hinge knuckle of one becomes disposed adjacently to the outer hinge knuckle of the other section, the hinge knuckles of the respective sections interleaving and aligning to thereby permit insertion of the hinge pin 32 therethrough.

The sections 34 are shown each to comprise a semicylindrical section having end walls 36. The two sections together define a cylindrical enclosure 38 which is adapted to receive and contain the waste material. However, the specific construction illustrated for the sections 34 is merely illustrative and is not intended to limit the various types of other shaped enclosures which may equally be utilized, with different degrees of advantage. Also, it should be clear, that the relative dimensions of the sections 34 may be varied while still accomplishing the object of the present invention. In fact, it is possible to manufacture an assortment of pickup devices, wherein the sections 34 are made in different sizes to accommodate different amounts of waste excreted by different sized animals.

As can best be seen in FIGS. 2 and 3, the sections 34 are hingedly connected to each other about the hinge pin 32 which is supported by the plunger 26. The sections 34 can, by pivotting about the hinge pin 32, move from closed positions, shown in FIG. 3, to opened or scooping positions shown in FIG. 2.

Referring to FIGS. 1-3, each of the sections 34 is provided with spaced protuberances or support knuckles 46. Knuckles 46 are axially disposed between the hinge knuckles 40, 42, as best seen in FIG. 1. While the hinge knuckles 40, 42 are provided adjacent to the elongate edges of the cylindrical sections 34, the support knuckles 46 are circumferentially spaced or remotely positioned from the hinge knuckles, as can best be seen in FIGS. 2 and 3. In effect, the hinge knuckles and the support knuckles define projections which are displaced angularly about the periphery or contour of the respective cylindrical sections 34.

A yoke 50 is provided which has a neck portion 52 which is fixed to the end of the tubular body 12 remote from the end 14. Any conventional means of attachment between the neck 52 and the tubular body 12 may be utilized, such as by utilizing threads or a press fit. As best seen in FIGS. 2 and 3, the yoke is provided with a pair of spaced opposing shoulders 54 each provided with an elongate slot or channel 56 directed in a direction transverse or normal to the elongate or axial direction of the tubular body 12 and generally disposed in a plane normal to the latter. The slots are generally parallel to each other and are inwardly open whereby the opening in one slot faces the other slot. The part of the yoke supported by the neck 52 is generally elongate and has a length which substantially corresponds to the distance between the support kunckles 46 on the sections 34.

Disposed in each of the elongate slots 56 is a pivot pin 58 which is contained in a respective slot and extends beyond the slot, the extensions being journalled in the support knuckles 46.

Optionally, pins 60 may be provided which extend through the neck 52 and the tubular body 12 for securing engagement therebetween. Similarly, a pin 62 may be provided which extends through the plunger 26 and the rod end 24 to provide similar permanent engagement.

From the above description, it should be clear that the pivot pins 58 are limited in linear movement to transverse movements within the shallow slots 56. Thus, the remote peripheral portions of the sections 34 to which are attached the support knuckles 46 always remains substantially equally spaced in an axial direction relative to the fixed yoke 50. However, the portions to which the hinge knuckles 40, 42 are connected are permitted to move axially with respect to the yoke 50 with corresponding movements of the plunger 26.

When the sections 34 are in their normally closed positions, as shown in FIG. 3, the pivot pins 58 are outwardly disposed in the elongate slots 56 away from the opened ends of the slots. At this time, the hinge pin 32 as shown is substantially aligned with the pivot pins 58 in the axial direction of the control rod 20.

When the button 22 is depressed into the handle 16, the control rod 20 urges the plunger 26 to be displaced axially so as to urge the hinge knuckles 40, 42 downwardly or in a direction away from the yoke 50. Such a downward force on the hinged knuckles generates a moment about each of the respective pins 58 which causes the respective sections to turn outwardly to the opened positions shown in FIG. 2. The moment arm is initially substantially defined by the transverse distance between the pins 58 and the hinge pin 32. However, because of the non-deformable nature of the sections 34, movement of the hinge knuckles 40, 42 requires corresponding movement of the pivot pins 58 to maintain the same spacing or distance therebetween. For this reason, the slots 56 are selected to be sufficiently wide to permit linear travel of the pivot pins 58 between the extreme outward positions, shown in FIG. 3, wherein the sections 34 are in their closed positions to extreme inward positions, shown in FIG. 2, wherein the sections 34 are disposed in their maximum open positions. As should be clear from the drawings, movement of the sections 34 to their open positions causes the pivot pins to move inwardly towards the plunger 26. Consequently, the slots 56 must be sufficiently wide to permit linear transverse movements of the pivot pins 58 to the extent necessary to bring the sections 34 to their outermost open positions. At the same time, care must be taken not to make the slots 56 too narrow, since this may enable the pivot pins 58 to undesirably move out of the respective slots 56 when the sections 34 are excessively opened.

The yoke 50, in accordance with the presently preferred embodiment, has the portion thereof connected to the neck 52 extending between the support knuckles 46, as suggested above. Such construction covers the major portion of the activating or control mechanism, including the plunger 26. As should be clear from the above description, the present construction conceals many of the operating parts, this making the device more aesthetic while remaining practical and simple to use.

Referring now to FIG. 4, the upper portion of the device, as viewed in FIG. 1, is illustrated in cross section. The button 22 is shown to extend substantially through the entire handle 16. At the end of the button 22 remote from the end which extends beyond the handle 16, a shoulder 70 is provided. A support block 72 is positioned remotely from the handle 16 and may be secured to the tubular body 12 in any conventional manner, such as by a locking set screw 74. A support block 72 is provided with an opening through which the control rod 20 can slidably pass. Disposed between the shoulder 70 and the support block 72 is a compressed helical coil spring 76. The action of the coil spring 76 is to urge the button 22 in an axially upward direction so as to more fully extend beyond the handle 16. Since the button 22 is fixed to the control rod 20, which is in turn fixed to the sections 34 by means of the plunger 26, one limiting extent of axial displacement of the button 22 is fixed by the movement of the sections 34 to their closed positions. As should be clear from an examination of FIG. 3, when the sections are closed, the plunger 26 can no longer continue to move axially in the direction of the handle 16. In essence, the non-deformable nature of the sections 34 fixes the upper position of the hinge pin 32 by virtue of the limited movement of the pivot pins 58 in the axial direction. Thus, once the sections 34 have moved to their closed positions and the hinge pin 32 has fully advanced into the yoke 50, further upward movment of the plunger 26, control rod 20 and button 22 is prevented.

The compressed nature of the coil spring thereby insures that the sections 34 always revert to their closed positions by upwardly urging the button 22 relative to the tubular body 12. As described, such upward axial movement of the button 22 applies upward forces, viewed in FIG. 3, to the sections 34 which create torques about the pivot pin 58 which tend to move the sections 34 to their closed positions.

When the button 22 is manually depressed, against the action of the coil spring 76, the control rod 20 is axially displaced downwardly, this generating forces on the hinge pin 32 which tend to lower the hinge knuckles 40, 42 relative to the slots 56. Accordingly, torques are generated which tend to move the sections 34 to their opened positions, as shown in FIG. 2.

The extent to which the sections 34 open is a function of the extent to which the button 22 is depressed into the handle 16. The more the button 22 is depressed into the handle, the wider the sections swing open. Accordingly, the button 22 advantageously extends sufficiently beyond the handle 16, so that when it is fully depressed into the handle the sections 34 move to their fully desired open position. To insure that the button 22 initially extends sufficiently beyond the handle 16, various adjustments may be made. Firstly, the handle 16 may be raised or lowered axially on the tubular body 12 so as to expose less or more of the button 22. Secondly, the control rod 20 may be provided with threads 80 which threadedly engage a threaded bore 82 in the button 22. Thus, the button 22 can be raised or lowered by merely rotating the same relative to the control rod 20. Finally, the entire control rod may be raised or lowered somewhat by adjusting the extent of axial engagement between the rod end 24 and the plunger 26. In all of these cases, the extent to which the button 22 protrudes or extends beyond the handle 16 may be adjusted so that when the button 22 is depressed into the handle 16, to the extent this is possible by a person's finger while the person is holding the handle 16, corresponding movement of the plunger 26 is sufficient to fully open the sections 34 to their desired open positions.

Once the button 22 has been fixed in its desired position, the position can be maintained by preventing subsequent relative axial movements between the button 22 and the control rod 20, as well as between the control rod 20 and the plunger 26. Thus, the pin 62 exemplifies one manner in which the degree of axial engagement between the rod end 24 and the plunger 26 may be maintained.

One way of preventing relative axial displacement between the button 22 and the control rod 20 is to provide a boss or protuberance 84 in the handle 16 through which a locking set screw 86 is provided and which penetrates into the cavity 87 of the tubular body 12. When the button 22 is threadedly engaged with a threaded end 80 of the rod 20, axial displacement between the button and the rod can be prevented by preventing relative rotational displacement therebetween. By providing a radial elongate slot or recess 88, the locking screw 86 can penetrate thereinto after the button 22 has been engaged with the rod sufficiently to expose a desired portion of the button 22 above the handle 16. Once the set screw 86 has penetrated the slot 88, the button 22 is prevented from rotating relative to the control rod 20, and consequently also prevented from being axially displaced relative to the control rod.

As described above, whenever the button 22 is depressed into the handle 16, the sections 34 swing to their opened positions. Upon release of the button 22, the helical spring 76 urges the button 22 to revert to its initial extended position, simultaneously causing the sections 34 to return to their closed positions shown in FIG. 3. A locking latch 90 may optionally be provided which locks the position of the button 22 in its depressed condition to thereby maintain the sections 34 in their opened positions. Such may be desired for scooping or gathering the waste material. Advantageously, the locking latch 90 can easily be released to thereby permit the coil spring 76 to push the bottom 22 outwardly once the waste material has been gathered to thereby enclose or contain the same.

According to the presently preferred embodiment, one example of a locking latch 90 is illustrated in FIG. 4. When a latch of the type to be described is utilized, a slot or aperture 92 is provided in the elongate tubular body 12. A slot or aperture 94 is similarly provided in the handle 16 so that the slot 94 can be aligned with the slot 92 by appropriately positioning the handle 16 on the tubular body 12. Such alignment of the slots 92, 94 exposes the cavity 87 interiorly of the tubular body 12.

The locking latch 90 comprises a pronged or forked pivot support 96, only one half of which is shown in the cross section of FIG. 4. A biassing finger 98 is pivotally mounted on a pivot pin or rivet 100 which is fixed between the pronged or forked pivot supports 96.

A lever 102 is connected to the finger 98 and extends in a direction generally opposite to the direction of the finger. A flat spring 104 is embedded in the finger 98 assembly, the other end of the spring being in biassing abutment against a surface 106 formed in a groove of the handle 16 defined by the two spaced pronged or forked pivot supports 96.

The action of the spring 104 is such as to rotate the lever 102 and the finger 98 in a general counterclockwise direction, as shown by the arrow 107. Such biassing action urges the finger 98 to penetrate into the cavity 23. However, the button 22 is selected to have sufficient length so as to normally cover up the apertures 92 and 94. Consequently, the finger 98 is prevented from penetrating the cavity 87 and merely rests and slides upon the button 22 as the latter is axially displaced within the tubular body 12.

To permit the sections 34 to be locked in their open positions, a recess 108 is provided in the button 22 which defines a detent surface 110 which is generally in a plane normal to the axial direction of the control rod 20.

As should be clear from FIG. 4, once the button 22 is sufficiently depressed so as to bring the recess 108 in opposition to the aperture 92 and 94, the finger 98 snappingly enters the recess 108. Such movement occurs as soon as the detent surface 110 is lowered below the extreme extent of the abutting finger 98. As soon as the finger 98 enters the recess 108, by the action of the flat spring 104, the button 22 is prevented from being axially displaced in the upward direction, as viewed in FIG. 4, because of the engagement obtained between the finger 98 and the detent surface 110.

To terminate the locking engagement between the finger 98 and the detent surface 110, the lever 102 may be rotated in a clockwise direction against the action of the spring 104. Such clockwise movement of the locking latch 90 moves the finger 98 outside of the recess 108, and the button 22 can be displaced axially without interference of the finger 98.

Any suitable materials may be utilized for the tubular body 12, the handle 16 and the sections 34. Also, while threaded engagement has been shown between some of the cooperating elements, it should be clear that other conventional means for joining such elements may equally be utilized.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. Pet waste pickup device comprising an elongate tubular body; a handle provided at one end of said tubular body; elongate control means extending through said tubular body and beyond said handle; a yoke having a neck fixedly connected to the other end of said tubular body, said yoke having two spaced opposing shoulders on opposite sides of said tubular body each provided with an elongate slot directed in a direction transverse to the elongate direction of said tubular body, said slots being parallel to one another and disposed substantially in a common plane normal to said tubular body; two scooping sections hingedly connected to each other about a common hinge pin for movement between closed positions, wherein said sections together define an enclosure adapted to contain the waste, and open positions, wherein each section defines a scoop adapted for picking up the waste; pivot pins disposed in said respective slots in said shoulders, said pins being limited to transverse movements within said slots towards and away from each other within said common plane, said sections being pivotally mounted on said yoke at points remote from the point of connection to said common hinge pin by means of said respective pivot pins, said elongate control means having one end thereof coupled to said common hinge pin for pivoting each of said sections about their respective pivot pins in response to axial displacement of the other end of said elongate control means and said common hinge pin while said pivot pins are displaced transversely to the axial direction of movement of said elongate control means, whereby said sections have two degrees of movement and can be remotely and selectively opened and closed while holding said handle by axially moving said elongate control means and simultaneously displacing each of said pins while said scooping sections pivot about the latter.

2. Pet pickup device as defined in claim 1, wherein said elongate control means comprises an elongate rod substantially extending the entire length of said tubular body, and a button fixed at the end of said rod positioned adjacently to said handle, said handle having an opening therethrough through which said button is slidably mounted and extends beyond said handle, whereby said rod is accessible and may be manipulated for axial movement by correspondingly axially moving said button.

3. Pet pickup device as defined in claim 1, wherein said elongate control means comprises a rod, an elongate plunger provided at one end of said rod, said plunger having a transverse bore dimensioned to receive with clearance said hinge pin, said plunger including means for variably axially engaging said rod, whereby the effective length of said elongate control means can be changed to thereby provide different degrees of pivotting movement of said sections for similar degrees of axial movements of said rod.

4. Pet pickup device as defined in claim 1, wherein said hinge pin is disposed midway between said pivot pins, said sections being movable towards said closed positions when said elongate control means axially moves in the direction of said handle relative to said tubular body, and said sections moving towards said open positions when said elongate control means moves axially in the direction away from said handle relative to said tubular body.

5. Pet pickup device as defined in claim 1, wherein said sections each comprise a semi-cylindrical section having two spaced elongate edges, said sections being hingedly connected to each other at one corresponding set of elongate edges, whereby said sections define a cylindrical enclosure when said sections are moved to said closed positions.

6. Pet pickup device as defined in claim 5, wherein each of said sections is provided with an inner hinge knuckle at one end of said section and an aligned opposing outer hinge knuckle at an opposite axial end of said section, each of said hinge knuckles being provided with holes adapted to receive said hinge pin, whereby mating of two sections to form an enclosure interleaves and aligns the inner and outer hinge knuckles of the respective sections to thereby permit insertion of said hinge pin therethrough.

7. Pet pickup device as defined in claim 6, wherein said sections are identical and said inner and outer hinge knuckles are similarly positioned on said sections whereby the latter are fully interchangeable.

8. Pet pickup device as defined in claim 1, wherein each slot is open on a side facing the other slot.

9. Pet pickup device as defined in claim 1, wherein said sections are provided with support knuckles at said remote points, said remote knuckles being provided with holes dimensioned to receive with clearance respective pivot pins.

10. Pet pickup device as defined in claim 1, further comprising biassing means cooperating with said elongate control means and said elongate tubular body for axially biassing said elongate control means to a normal position wherein said elongate tubular body is disposed at a limiting axial position towards said handle and wherein said sections are in said closed positions.

11. Pet pickup device as defined in claim 10, wherein said elongate control means comprises shoulder means directed away from said handle, and further comprising a support block spaced from said handle and fixed in said tubular body, said support block being provided with aperture means for permitting passage therethrough of said elongate control means, said biassing means comprising a helical spring disposed between said support block and said shoulder means in a compressed state, whereby said spring urges said elongate control means to axially move towards said handle and thereby pivot said sections about said pivot pins to said closed positions.

12. Pet pickup device as defined in claim 1, wherein said elongate control means comprises an elongate rod and a button threadingly connected to the latter, said button being partially disposed in said handle and provided with an axial slot, and further comprising a set screw mounted in said handle and tubular body adapted to extend into said slot and prevent relative rotary movement between said handle, tubular body and said button, whereby loosening of the latter three elements is prevented.

13. Pet pickup device as defined in claim 1, further comprising locking means for locking said sections in said open positions by maintaining said elongate control means in a position axially shifted from a normal position with respect to said handle, said locking means comprising a spring biassed latch mounted on said handle which is snappingly engageable with a detent surface on said elongate control means when the latter is moved axially a predetermined amount to cause said sections to open to desired open positions.

14. Pet pickup device as defined in claim 14, further comprising biassing means cooperating with said elongate control means and said tubular body for biassing said elongate control means relative to said tubular body in a direction towards said handle against the action of said locking means.

15. Pet pickup device as defined in claim 14, wherein said locking means comprises a forked pivot support on said handle; a spring biassed finger pivotally mounted on said forked pivot support, said handle and said tubular body being provided with aligned aperture means through which said biassed finger may pass when said elongate control means brings said sections to said open positions to thereby engage said detent surface and lock said sections in said open positions.

* * * * *